April 13, 1954  F. H. STIELTJES  2,675,428
CABLE BALANCE
Filed Feb. 2, 1950  2 Sheets-Sheet 1

INVENTOR.
Frederik H. Stieltjes
BY

April 13, 1954  F. H. STIELTJES  2,675,428
CABLE BALANCE
Filed Feb. 2, 1950  2 Sheets-Sheet 2
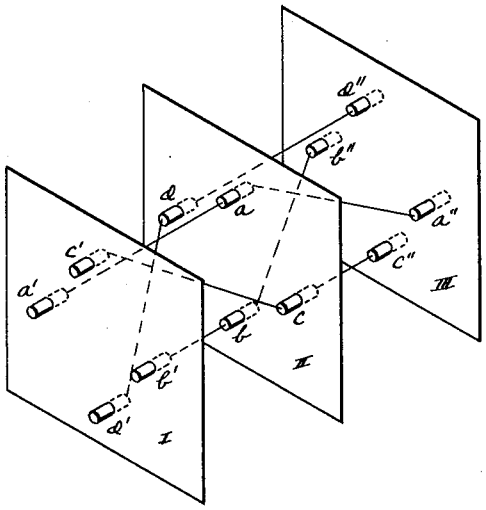
FIG.6.
FIG.7.
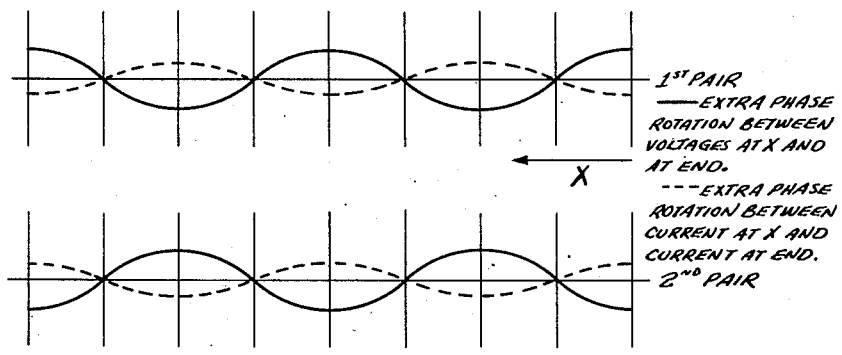
1ˢᵀ PAIR
——— EXTRA PHASE ROTATION BETWEEN VOLTAGES AT X AND AT END.
--- EXTRA PHASE ROTATION BETWEEN CURRENT AT X AND CURRENT AT END.
2ᴺᴰ PAIR
FIG.8.
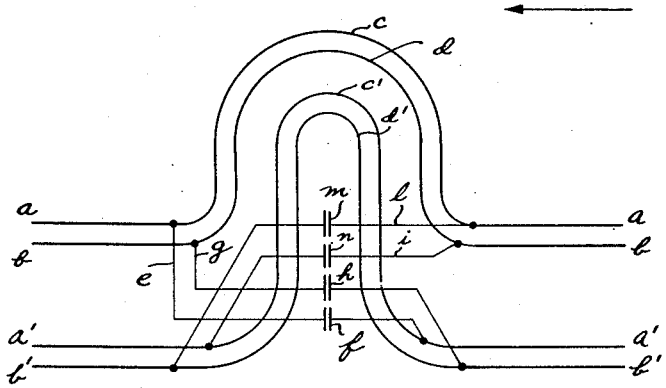
FIG.9.
INVENTOR.
Frederik H. Stieltjes
BY Patented Apr. 13, 1954

2,675,428

UNITED STATES PATENT OFFICE 2,675,428

CABLE BALANCE

Frederik H. Stieltjes, Eindhoven, Netherlands, assignor to The International Standard Electric Corporation, New York, N. Y.

Application February 2, 1950, Serial No. 141,900
In the Netherlands September 26, 1940

Section 1, Public Law 690, August 8, 1946
Patent expires September 26, 1960

2 Claims. (Cl. 179—78)

The present invention relates to the balancing of a carrier cable and more particularly to the balancing of a high frequency carrier cable.

This application is a continuation-in-part of my application Serial No. 766,708, filed August 6, 1947 for Method of Balancing a Carrier Cable and Cable Balanced According to This Method.

It has been discovered that the known methods for correcting the near-end and the far-end cross-talk in a cable having several conductors are inadequate when the frequency of the signals exceeds 40 kc. per sec. Beyond this value effects to be called hereinafter asymmetrical far-end cross-talk disturb the transmission which at lower frequencies are too small for interfering with the transmission.

The invention will be more fully understood from the following detailed description with reference to the accompanying drawings in which Figures 1 and 2 are two circuit diagrams of a disturbing circuit and a disturbed circuit;

Figure 6 shows in diagrammatic perspective view a spiral-four group;

Figures 7 and 8 are diagrams showing, the phase rotation of voltages respectively currents, between a point of a cable and its end for the pairs constituting the cable; and Figure 9 is a wiring diagram of a cable provided with balancing means according to the invention.

Figure 1:
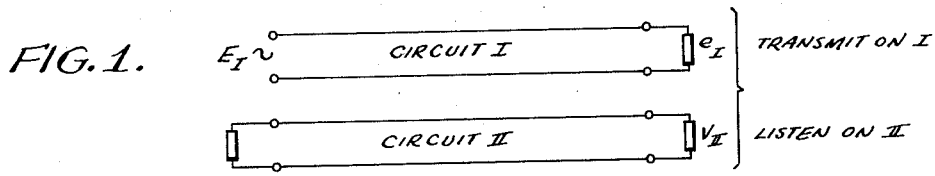
Figure 2:
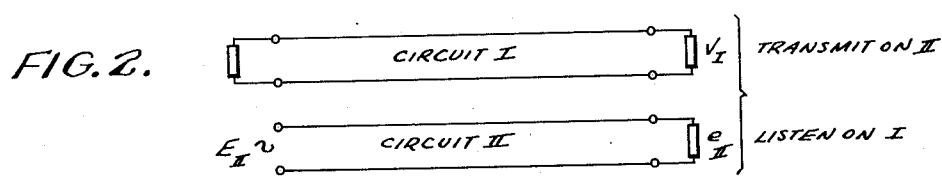

Referring now to the drawings and first to the diagrams shown in Figures 1 and 2, each diagram comprises two circuits I and II. In the diagram according to Fig. 1, circuit I is the transmission circuit which is supplied with a signal voltage $E_I$ which causes a voltage $e_I$ at an impedance terminating the far end of circuit I. Circuit II is terminated on both ends by impedances, a voltage $v_{II}$ appearing on the far-end impedance when circuit I is fed with the voltage $E_I$ as shown. The reduced far-end cross-talk ratio is defined by $$t_{I,II} = \frac{v_{II}}{e_I}$$

Conversely circuit II may be the transmission circuit and circuit I the listening circuit as shown in Figure 2 in which a signal voltage $E_{II}$ is supplied to circuit II where it produces a voltage $e_{II}$ across an impedance arranged at the far-end and induces voltages in circuit I which is terminated by proper impedances on both ends, the induced voltage at the far-end being $v_I$. The reduced far-end cross-talk ratio is defined by $$t_{II,I} = \frac{v_I}{e_{II}}$$

These two far-end cross-talk ratios are not necessarily equal. If they are unequal the far-end cross-talk is said to be asymmetrical, in which case $$t_{I,II} \neq t_{II,I}$$

If the far-end cross-talk is symmetrical $$t_{I,II} = t_{II,I}$$

If the far-end cross-talk is asymmetrical, it can be considered as consisting of two components, a symmetrical component $t_s$ and an alternating or anti-symmetrical component $t_a$ so that $$t_{I,II} = t_s + t_a$$

and $$t_{II,I} = t_s - t_a$$

In practice the cross-talk ratios are measured in decibels so that $$b_{I,II} = -20 \log |t_{I,II}|$$

and $$b_{II,I} = -20 \log |t_{II,I}|$$

The known balancing methods which aim at the suppression of the symmetrical far-end cross-talk allow only one of the far-end cross-talk ratios to be improved for instance that for transmission on circuit I and listening on circuit II. When a cable is balanced according to the known balancing methods the other far-end cross-talk ratio (for instance that for transmission on circuit II and listening on circuit I) may become worse than it was before the balancing was carried out.

The following summarises some of the causes of the far-end cross-talk between two circuits:

a. A first cause consists in capacitive, magnetic and resistance couplings between the two circuits which cause normal near-end and far-end cross-talk;

b. A second cause consists in the coupling of the two circuits with one or more third circuits. Such coupling cause a transmission of energy from the disturbing circuit to the third circuit which in turn acts as a disturbing circuit on the other, the disturbed circuit. Thus an indirect far-end cross-talk is caused between the disturbing circuit and the disturbed circuit.

If the disturbing and disturbed circuits are designed equal to each other they have the same transmission properties. If also the couplings mentioned under a are predominating over those under b, only a direct symmetrical far-end cross-talk exists between the two circuits which can be easily balanced by known methods. Since both circuits have the same transmission properties the disturbing voltage in one circuit are subject to the same modifications during their propagation over the circuits. Thus, it is irrelevant where the coupling between the two circuits is arranged so that the far-end cross-talk voltage can be reduced by a suitable counter-coupling between the two circuits which may be arranged anywhere.

However, neither the near-end cross-talk caused by direct couplings between the two circuits nor the indirect far-end cross-talk has the property that the disturbing voltage in the disturbing circuit and the disturbed voltage in the disturbed circuit are subject to the same modifications. This fact is probably the reason for the fact mentioned hereabove that at a frequency exceeding 40 kc. per sec. an asymmetrical far-end cross-talk becomes troublesome which is negligible at low frequencies and cannot be easily balanced.

I have found however, that unexpectedly at these high frequencies the group transmission properties are unequal, so that an asymmetrical far-end cross-talk appears, the character of which is systematic, for instance proportional to the square of frequency, and my invention allows to balance this asymmetrical far-end cross-talk.

In my copending application Serial No. 141,898 filed on February 2, 1950, I have described and claimed methods for balancing a high frequency carrier cable against systematical asymmetrical far-end cross-talk, comprising the reduction of the effects of the so-called "helical coupling" and of differences of phase rotations of different circuits. These methods can be applied together with the present invention.

It should be observed that hitherto the art has yielded many, mainly successful efforts to compensate for symmetrical far-end cross-talk. It had been recognized that irregular causes of asymmetrical far-end cross-talk existed, but not that this phenomenon was also connected with systematic features ("helical coupling"). It has become evident that by careful construction the irregular causes can be rendered harmless below 200 kc., but no remedy has yet been provided against the influence of the systematic features. As an instance of irregular causes it may be observed that the near-end cross-talk is converted into a far-end cross-talk if external or irregular internal reflections come into play.

Therefore the circuits should be properly terminated especially at the receiving side of the disturbing circuit and the transmission side of the disturbed circuit. The circuits should further be made as homogeneous as possible.

The present invention, as well as those of the copending application, starts from the assumption, that the irregular causes have been reduced to the utmost and is chiefly concerned with reducing or eliminating the systematic features of asymmetrical far-end cross-talk. Any construction only tending to combat irregular causes is not covered in the claims.

In my copending application Serial No. 141,898 filed February 2, 1950, it has been shown that alternating asymmetrical far-end cross-talk is caused by a "helical coupling" which practically depends on the helical formation of the star groups.

It is shown in the last mentioned application, that the "helical coupling" may be due to the presence of electric and magnetic fields extending longitudinally in helical quads and to the phase rotations in longitudinal direction.

Fig. 6 shows part of a spiral group comprising two pairs $a$, $b$ and $c$, $d$ showing the helical or spiral coupling effect. For a full disclosure reference is made to the last mentioned application. It has been shown in this specification that the resulting effects (the uncompensated part of the coupling) is proportional to $\omega^2$, where $\omega$ is the circular frequency.

In the same application I have disclosed, that another cause of helical coupling exists. This second effect consists in the periodic fluctuations in capacities and inductances, caused by the fact that the four conductors constituting the quad successively take different positions with respect to the surroundings in the cable and consequence of spiralisation of the quad. These produce fluctuations in mutual capacity and inductance around a positive value for the two pairs as shown in Fig. 3 and 4 of the drawings and fluctuations of the magnetic and capacitive unbalance between the two pairs around zero as shown in Fig. 5 of the drawings.

Figure 5:
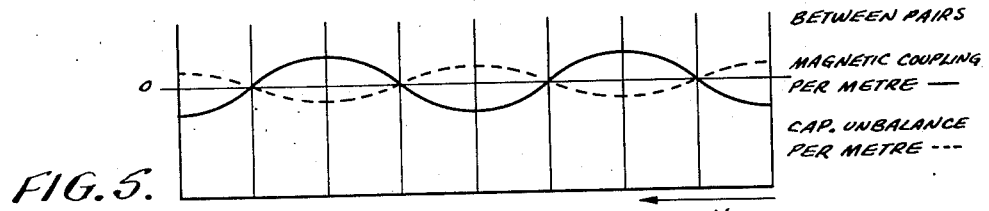
Figure 5 is a diagram showing similar curves as Figures 3 and 4 illustrating the specific magnetic coupling and capacitive unbalance.

Fig. 5 shows the specific magnetic coupling in full lines and the specific capacitive unbalance in dotted lines which exist between the two pairs of conductors of the cable.

Figure 3:
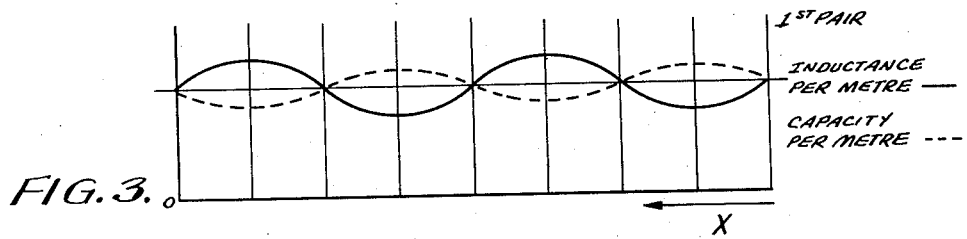
Figures 3 and 4 are diagrams showing, respectively, the specific inductance and capacity of the two pairs of conductors of a spiral-four group in dependence on the distance from the end of the cable.
Figure 4:
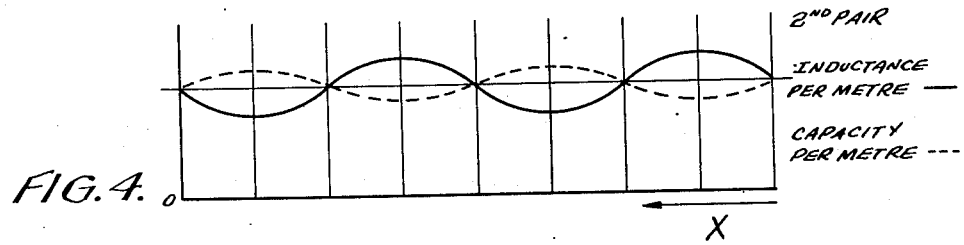

Figs. 7 and 8 are diagrams similar to Figs. 3 and 4 showing the extra-phase fluctuations in the voltages and currents which are caused by the fluctuations of the specific inductance and specific capacity of the pairs shown in Figs. 3 and 4.

If magnetic and capacitive couplings exist at the same time a disturbance is introduced which is displaced in time by 90° with respect to the inducing voltage or current. The Figs. 3, 4, 5, 7 and 8 are copied from the drawings of my copending application Serial No. 141,898, filed February 2, 1950, to which reference is made for a full disclosure of the effect of the inductance and capacity fluctuations. It is only observed, that the influence of this effect is also proportional to $\omega^2$.

The present invention balances systematical alternating far-end cross-talk by additional external means of correction, as distinguished from the copending applications, where the effect was removed by judicious construction or installation of otherwise normal cables. These means are connected to places of the cable where differences between the phase rotations of the circuits occur. According to a preferred embodiment of the invention an artificial extension cable is used for carrying out the invention.

In an embodiment of the invention a capacitive and/or magnetic coupling is provided between any two circuits at the beginning of the cable, and at a distant point where differences in phase rotation of the two circuits, with respect to the beginning occur, a capacitive and/or magnetic coupling of opposite sign being applied between the same 2 circuits, so that an alternating far-end cross-talk is artificially produced which reduces an existing cross-talk of the same kind. Owing to the opposite sign of the applied couplings no symmetrical far-end cross-talk is caused by them in the cable.

If there is no difference in phase rotation as for instance, with circuits within one group, these differences have to be created artificially for instance by connecting a drum carrying an artificial extension to one of the ends of the cable and by providing the means of correction between points of the extension on the drum and points of the cable.

This method of artificially extending a cable by means of a drum may even be applied to cables which show by themselves differences in phase rotation in their circuits, thus leading to greater flexibility in the operation of balancing.

Referring now to Fig. 9 of the drawings, a diagram is shown by way of example of a certain set of 2 circuits of a cable, a circuit $a$, $b$ and a circuit $a^1$, $b^1$. Artificial extensions of these circuits are denoted by $c$ for conductor $a$, by $d$ for conductor $b$, by $c^1$ for conductor $a^1$, and by $d^1$ for conductor $b^1$. The beginning of the extension $c$ is connected to the end of extension $c'$ by a cross connection $e$ incorporating a condenser $f$. Similarly the beginning of the artificial extension $d$ is connected to the end of the artificial extension $d'$ by a cross connection $g$ incorporating a condenser $h$. The beginning of the artificial extension $c'$ is connected to the end of the artificial extension $d$ by a cross connection $i$ incorporating a condenser $k$. The beginning of artificial extension $d'$ is connected to the end of artificial extension $c$ by a cross connection $l$ incorporating a condenser $m$.

The beginning and the end of the extensions are arranged close to each other, so that the cross connections from the beginning to the end of the extensions need not be extensive. The condensers are of substantially equal capacity, so that phase rotations between the two circuits are effectively corrected. The condenser system does not introduce any symmetrical coupling.

The method illustrated by Fig. 9 is applicable for instance in the case of a prelaid cable, which is interrupted at a suitable place and provided with an artificial extension and the cross connections incorporating the condensers shown in Fig. 9; the extensions may however also be provided at a cable extremity.

The described means are effective for reducing the anti-symmetric far-end cross-talk between the circuits if the phase rotation differences in the cable are not too large, for instance if they do not exceed 45°. If the phase rotations do exceed this value a combination of the present invention with one or both of the inventions disclosed in my copending application will be effective in reducing the far-end cross-talk. Preferably the cable is rejointed at some places so as to keep the differences of phase rotation within reasonable limits and then the remaining asymmetrical far-end cross-talk is eliminated by means of the coupling condensers disclosed hereinabove.

It will be understood that each of the elements described above, or two or more together, may also find a useful application in other types of carrier cables differing from the types described above.

While I have illustrated and described the invention as embodied in carrier cable for transmitting high frequency signals, I do not intend to be limited to the details shown, since various modifications and structural changes may be made, without departing in any way from the spirit of my invention, such as replacing the shunt condensers by mutually coupled series impedance coils the coupling in any case existing only between a series element at the entrance and a series element at the outgoing end of the extensions.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a high frequency carrier cable having a plurality of pairs of conductors, in which said cable is formed in a plurality of interconnected sections, the combination of artificial cable extensions interconnecting like conductors of each pair at the juncture of such sections, and cross-connections at such junctures interconnecting the wires of one pair, from one side of the interconnecting extensions to the respective wires of the other pair on the opposite side of the interconnecting extensions, and condensers serially included in each of said cross-connections.

2. The combination according to claim 1, in which said extensions are all of substantial equal capacity.

References Cited in the file of this patent

UNITED STATES PATENTS

| Number | Name | Date |
| --- | --- | --- |
| 1,720,616 | Werren | July 9, 1920 |
| 1,861,524 | Coolidge | June 7, 1932 |
| 1,888,558 | Latimer | Nov. 22, 1932 |